United States Patent
Okumoto et al.

(10) Patent No.: US 7,420,313 B2
(45) Date of Patent: *Sep. 2, 2008

(54) TANDEM TYPE ROTARY GENERATOR GENERATING TWO VOLTAGES

(75) Inventors: Kazushige Okumoto, Kariya (JP); Shin Kusase, Oobu (JP)

(73) Assignee: Denso Corporation, Kariya (JP)

( * ) Notice: Subject to any disclaimer, the term of this patent is extended or adjusted under 35 U.S.C. 154(b) by 171 days.

This patent is subject to a terminal disclaimer.

(21) Appl. No.: 11/363,065

(22) Filed: Feb. 28, 2006

(65) Prior Publication Data

US 2006/0220477 A1  Oct. 5, 2006

(30) Foreign Application Priority Data

Mar. 30, 2005  (JP)  ............................. 2005-099225

(51) Int. Cl.
*H02K 19/34* (2006.01)
(52) U.S. Cl. .......................... 310/263; 310/58; 310/114
(58) Field of Classification Search ................. 310/114, 310/263, 58
See application file for complete search history.

(56) References Cited

U.S. PATENT DOCUMENTS

| | | | |
|---|---|---|---|
| 5,177,388 A | | 1/1993 | Hotta et al. |
| 5,543,677 A | * | 8/1996 | Fakler ........................ 310/263 |
| 2006/0097670 A1 | | 5/2006 | Fukasaku et al. |
| 2007/0013261 A1 | * | 1/2007 | Shichijo et al. ............. 310/263 |
| 2007/0013262 A1 | * | 1/2007 | Okumoto et al. ............ 310/263 |

FOREIGN PATENT DOCUMENTS

| | | |
|---|---|---|
| JP | A 1-157251 | 6/1989 |
| JP | A 5-83906 | 4/1993 |
| JP | A 5-137295 | 6/1993 |
| JP | A 5-308751 | 11/1993 |

OTHER PUBLICATIONS

Office Action issued in Canadian Application No. 2,539,680 on Aug. 2, 2007.

* cited by examiner

*Primary Examiner*—Burton Mullins
(74) *Attorney, Agent, or Firm*—Oliff & Berridge, PLC

(57) ABSTRACT

A tandem type rotary generator has a rotary shaft, and two power generating sections disposed adjacent to each other along an axial direction. Each power generating section has a Lundell type rotor core fixed to the rotary shaft, a field coil wound on the rotor core, a stator core disposed on an outside of the rotor core opposite to the rotary shaft in a radial direction, and a stator coil wound on the stator core. A center of the field coil of each power generating section is positioned away from a center of the stator core of the power generating section in the axial direction toward the other power generating section. Two cooling fans cooling the power generating sections are disposed on both sides of the pair of rotor cores in the axial direction.

11 Claims, 4 Drawing Sheets

TANDEM TYPE ROTARY GENERATOR GENERATING TWO VOLTAGES

CROSS-REFERENCE TO RELATED APPLICATION

This application is based upon and claims the benefit of priority of the prior Japanese Patent Application 2005-099225 filed on Mar. 30, 2005 so that the contents of which are incorporated herein by reference.

BACKGROUND OF THE INVENTION

1. Field of the Invention

The present invention relates to a tandem type rotary generator having two Lundell type rotors disposed tandem to independently generate two voltages of electric power.

2. Description of Related Art

To double electric power generated in a rotary generator, a tandem type rotary generator having two Lundell type rotor cores tandem connected with each other has been proposed in Published Japanese Patent First Publications H01-157251, H05-137295 and H05-308751. In this rotary generator, generation of electric power can be easily controlled, and two voltages can be independently outputted. Therefore, as compared with installation of two generators for outputting two voltages, an installation space and manufacturing cost can be reduced. The tandem type rotary generator independently outputting two voltages is preferably applied as a two-voltage rotary generator wherein a high voltage such as 42V is independently outputted in addition to a normal voltage like 12V.

However, in the conventional tandem type rotary generator, because two power generating sections are disposed in tandem along an axial direction of a rotary shaft, the rotary generator is undesirably lengthened in the axial direction. Further, because the power generating sections acting as two heat sources are disposed near to each other, a spatial density in heat generation is increased, and it is difficult to dispose a cooling system in the generator such that the cooling system effectively dissipates heat from the generator.

For example, when a rotary generator has only a single power generating section, two cooling fans can be disposed on both sides of the power generating section, respectively. Therefore, the cooling fans can effectively cool the single power generating section. However, when a rotary generator has two power generating sections disposed tandem, a single cooling fan can be disposed only on one side of each power generating section in the axial direction. As a result, as compared with a Lundell type rotary generator having only a single power generating section, temperature-sensitive parts such as coils coated with resin are extremely heated up in the tandem type rotary generator. In this case, resin of coils is melted or broken, so that insulation between the coils undesirably deteriorates.

SUMMARY OF THE INVENTION

An object of the present invention is to provide, with due consideration to the drawbacks of the conventional tandem type rotary generator, a tandem type rotary generator wherein a length in an axial direction of a rotary shaft is shortened while temperature of assembled parts is prevented from being extremely heightened.

According to a first aspect of this invention, the object is achieved by the provision of a tandem type rotary generator having a rotary shaft possible to be rotated on an axis thereof, two power generating sections disposed adjacent to each other along an axial direction of the rotary shaft, and a cooling section which cools the power generating sections. Each power generating section has a Lundell type rotor core fixed to the rotary shaft, a field coil wound on the rotor core so as to be possible to generate a magnetic field in the rotor core, a stator core disposed on an outside of the rotor core opposite to the rotary shaft in a radial direction of the rotary shaft, and a stator coil wound on the stator core so as to be possible to generate electric power based on the magnetic field. The rotor cores are disposed to face each other such that a center of the field coil of each power generating section in the axial direction is positioned away from a center of the stator core of the power generating section in the axial direction toward the other power generating section. The cooling section has two cooling fans disposed, respectively, on both sides of the pair of rotor cores in the axial direction.

Because the rotor cores are disposed to face each other such that the center of the field coil of each power generating section is positioned away from the center of the stator core of the power generating section toward the other power generating section, large open spaces can be secured on both sides of the pair of rotor cores in the axial direction. Therefore, a cooling fan having a large size can be disposed on each of the sides of the pair of rotor cores. Accordingly, a length of the generator in the axial direction can be shortened, and cooling performance can be improved so as to prevent temperature of the power generating sections from being extremely heightened.

According to a second aspect of this invention, the object is achieved by the provision of a tandem type rotary generator having a rotary shaft possible to be rotated on an axis thereof, two power generating sections disposed adjacent to each other along an axial direction of the rotary shaft, and a spacer disposed between the power generating sections. Each power generating section has a Lundell type rotor core fixed to the rotary shaft, a field coil wound on the rotor core so as to be possible to generate a magnetic field in the rotor core, a stator core disposed on an outside of the rotor core opposite to the rotary shaft in a radial direction of the rotary shaft, and a stator coil wound on the stator core so as to be possible to generate electric power based on the magnetic field. The spacer is made of magnetic material and is attached to the power generating sections such that heat generated in one of the power generating sections is transmitted to the other power generating section through the spacer.

Therefore, heat of the power generating section having a higher temperature can be preferably dissipated to the power generating section having a lower temperature through the spacer, and temperature of the power generating sections can be further prevented from being extremely heightened.

According to a third aspect of this invention, the object is achieved by the provision of a tandem type rotary generator having a rotary shaft possible to be rotated on an axis thereof, two power generating sections disposed adjacent to each other along an axial direction of the rotary shaft, and a torque transmitter transmitting torques required in the power generating sections to the rotary shaft. Each power generating section has a Lundell type rotor core fixed to the rotary shaft, a field coil wound on the rotor core so as to be possible to generate a magnetic field in the rotor core, a stator core disposed on an outside of the rotor core opposite to the rotary shaft in a radial direction of the rotary shaft, and a stator coil wound on the stator core so as to be possible to generate electric power based on the magnetic field. The torques required in the power generating sections differ from each other, and the torque transmitter is disposed on a side of the power generating section requiring a larger torque opposite to the other power generating section requiring a smaller torque in the axial direction.

Therefore, torsion added to the rotary shaft can be reduced, and a diameter of the rotary shaft can be lowered.

According to a fourth aspect of this invention, the object is achieved by the provision of a tandem type rotary generator having a rotary shaft possible to be rotated on an axis thereof, two power generating sections disposed adjacent to each other along an axial direction of the rotary shaft, and a current controller controlling currents outputted from the power generating sections. Each power generating section has a Lundell type rotor core fixed to the rotary shaft, a field coil wound on the rotor core so as to be possible to generate a magnetic field in the rotor core, a stator core disposed on an outside of the rotor core opposite to the rotary shaft in a radial direction of the rotary shaft, and a stator coil wound on the stator core so as to be possible to generate electric power based on the magnetic field. Degrees of electric power generated in the power generating sections differ from each other, the current controller is disposed on a side of the power generating section generating a lower degree of electric power opposite to the power generating section generating a higher degree of electric power in the axial direction.

Therefore, because heat generated in the power generating section generating a lower degree of electric power is lower than that in the other power generating section, temperature of the current controller can be prevented from being excessively heightened.

According to a fifth aspect of this invention, the object is achieved by the provision of a tandem type rotary generator having a rotary shaft possible to be rotated on an axis thereof, two power generating sections disposed adjacent to each other along an axial direction of the rotary shaft, and a rectifier rectifying alternating currents of electric power generated in the power generating sections. Each power generating section has a Lundell type rotor core fixed to the rotary shaft, a field coil wound on the rotor core so as to be possible to generate a magnetic field in the rotor core, a stator core disposed on an outside of the rotor core opposite to the rotary shaft in a radial direction of the rotary shaft, and a stator coil wound on the stator core so as to be possible to generate electric power based on the magnetic field. The rectifier outputs a first voltage and a second voltage based on the rectified currents. The rectifier generates the first voltage from voltages of the rectified currents such that the first voltage is higher than the voltages of the rectified currents and the second voltage.

Therefore, because the number of turns of each stator coil can be set to generate a voltage lower than the first voltage, the number of turns of each stator coil can be reduced as compared with a case where the number of turns of the stator coil is set to generate the first voltage. Further, a sectional area of the stator coil can be increased, so that heat generated in the stator core can be reduced.

DETAILED DESCRIPTION OF THE PREFERRED EMBODIMENTS

Figure 1:
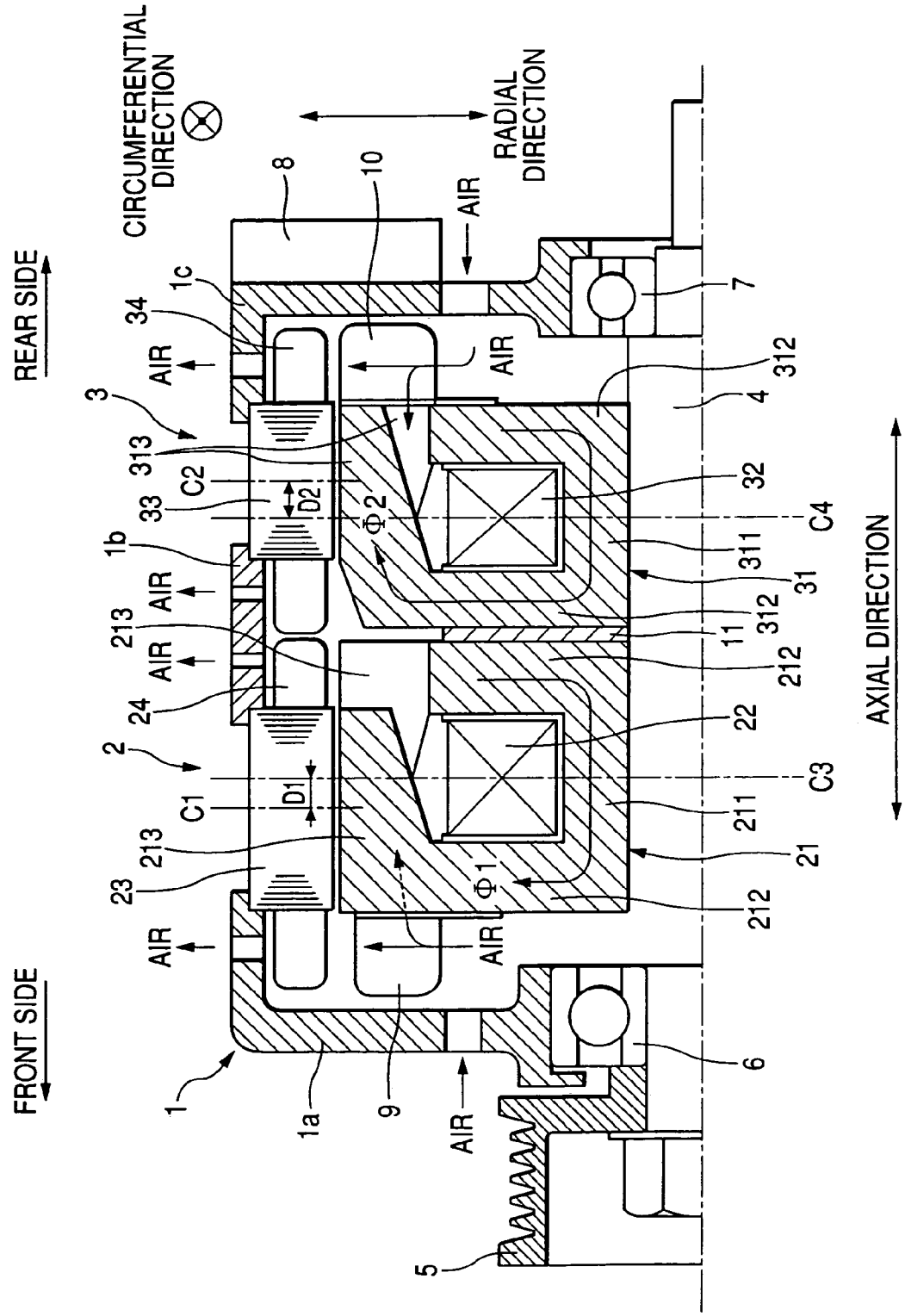
FIG. 1 is a vertical sectional view of a tandem type rotary generator, taken along an axial direction of a rotary shaft, according to an embodiment of the present invention.
Figure 2:
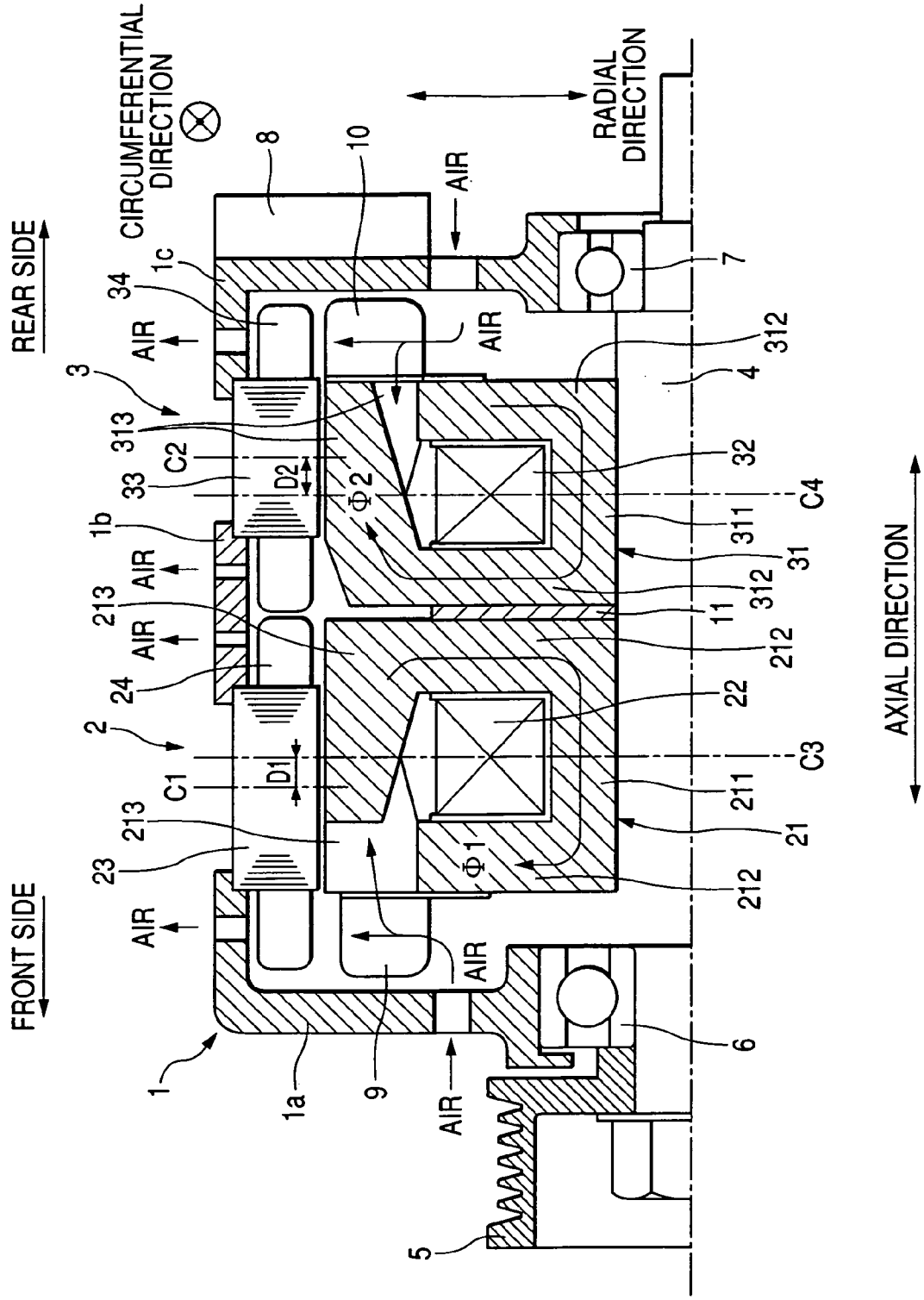
FIG. 2 is a vertical sectional view of a tandem type rotary generator according to another embodiment of the present invention.

FIG. 1 is a vertical sectional view of a tandem type rotary generator according to an embodiment of the present invention, and FIG. 2 is a vertical sectional view of a tandem type rotary generator according to another embodiment of the present invention. As shown in FIGS. 1 and 2, a tandem type rotary generator has a rotary shaft 4 rotatable on an axis thereof, a first power generation rotary section 2, a second power generation rotary section 3, and cooling fans 9 and 10. The rotary sections 2 and 3 are disposed adjacent to each other along an axial direction of the shaft 4.

The rotary section 2 has a Lundell type rotor core 21 fixed to the shaft 4, a field coil 22 wound on the rotor core 21, a stator core 23 positioned on an outside of the rotor core 21 opposite to the shaft 4 in a radial direction of the shaft 4, and a stator coil 24 wound on the stator core 23. In the same manner as the rotary section 2, the rotary section 3 has a Lundell type rotor core 31, a field coil 32, a stator core 33 and a stator coil 34.

The rotor cores 21 and 31 are disposed to face each other. A center C3 of the field coil 22 in the axial direction is differentiated or positioned away from a center C1 of the stator core 23 in the axial direction toward the rotor core 31 so as to have a first predetermined difference D1 between the centers C1 and C3 in the axial direction. Therefore, an electromagnetic effect exerting on the stator coil 24 is maximized at a position deviated from the center C1 toward the stator core 33 by the first predetermined difference D1 in the axial direction. A center C4 of the field coil 32 in the axial direction is differentiated or placed away from a center C2 of the stator core 33 in the axial direction toward the rotor core 21 so as to have a second predetermined difference D2 between the centers C2 and C4 in the axial direction. Therefore, an electromagnetic effect exerting on the stator coil 34 is maximized at a position deviated from the center C2 toward the stator core 23 by the second predetermined difference D2 in the axial direction. Accordingly, a distance between the rotor cores 21 and 31 in the axial direction can be shortened as compared with a case where the centers C3 and C4, respectively, coincide with the centers C1 and C2 in the axial direction so as to maximize an electromagnetic effect exerting on the stator coils 24 and 34 at the centers C1 and C2.

The cooling fans 9 and 10 are, respectively, disposed on both sides of the pair of rotor cores 21 and 31 in the axial direction.

When an electric current is supplied to the field coil 22 or 32, a magnetic field is generated in the rotor core 21 or 31 while generating heat. When the shaft 4 is rotated on an axis thereof, the rotor cores 21 and 31 are rotated with the shaft 4. Therefore, electric power is generated in each of the stator coils 24 and 34 while generating heat, and two voltages are outputted from the stator coils 24 and 34. The cooling fans 9 and 10 cool the rotary sections 2 and 3 to dissipate the heat to the outside of the generator.

Because the rotor cores 21 and 31 are disposed closely from each other such that a distance between the centers C3 and C4 is smaller than a distance between the centers C1 and C2, open spaces can be secured on both sides of the pair of rotor cores 21 and 31 in the axial direction. Accordingly, large sized cooling fans 9 and 10 can be disposed in the open spaces, and increase in a length of the generator in the axial direction can be suppressed.

Embodiments of the present invention will now be described with reference to the accompanying drawings.

In an embodiment shown in FIG. 1, the rotary generator may further have a housing 1 enclosing the rotary sections 2 and 3 and the cooling fans 9 and 10, a pulley (or torque transmitter) 5, bearings 6 and 7, a circuit device 8, and a spacer 11 disposed between the rotor cores 21 and 31. The housing 1 has a front housing 1a, a center housing 1b and a rear housing 1c connected with each other by using through volts (not shown). The shaft 4 is rotatably supported by the housing 1 through the bearings 6 and 7 at front and read sides in the axial direction, and a front portion of the shaft 4 is protruded from the front housing 1a toward the front side of the generator. The pulley 5 is fixed to the front portion of the shaft 4 to transmit a torque to the shaft 4. The circuit device 8 is disposed on the rear end side and is fixed to an outside surface of the rear housing 1c.

Each of the rotor cores 21 and 31 is composed of a plurality of rotor core members (not shown) serially disposed along a circumferential direction of the shaft 4 so as to surround the shaft 4. Each rotor core member of the rotor cores 21 and 31 may be formed of a larger half core formed in a C shape in section and a smaller half core formed in an L shape in section. Each larger half core has a half of boss portion 211, a pole portion 212 and a nail portion 213, and each smaller half core has the other half of boss portion 211 connected with the half of boss portion 211 and another pole portion 212. Therefore, the rotor core 21 has the boss portion 211, the pole portions 212 and the nail portion 213 integrally formed with one another for each member. The field coil 22 is disposed in a center hole of the rotor core 21 and is wound on the boss portions 211. The center C3 of the field coil 22 substantially coincides with a center of the rotor core 21 in the axial direction. In the same manner, the rotor core 31 may have a boss portion 311, pole portions 312 and a nail portion 313 for each member of the rotor core 31, and the field coil 32 is wound on the boss portions 311.

More specifically, the rotor core members having the larger half cores on the front side and the rotor core members having the larger half cores on the rear side are alternately arranged in each of the rotor cores 21 and 31 along the circumferential direction at intervals of half magnetic pole pitch. In this embodiment, each pair of rotor core members of the rotor cores 21 and 31 placed at the same position in the circumferential direction has two larger half cores placed on the same (front or rear) side of the rotor cores 21 and 31.

The half cores placed on the rear side of the rotor core 21 and the half cores placed on the front side of the rotor core 31 are attached to surfaces of the spacer 11, so that the rotor cores 21 and 31 are closely adjacent to each other. The spacer 11 is made of non-magnetic material superior in thermal conductivity and formed in a ring plate shape. The spacer 11 is, for example, made of cupper or aluminum. Therefore, heat generated in one of the rotor cores 21 and 31 can be immediately transmitted to the other rotor core. Further, because the spacer 11 is made of non-magnetic material, the spacer 11 prevents a magnetic field induced in each of the rotor cores 21 and 31 from interfering with a magnetic field induced in the other rotor core. Therefore, independent control for two voltages generated in the rotary sections 2 and 3 can be improved.

Three slip rings and three brushes (not shown) are disposed on a rear end side of the shaft 4 to feed electric currents to the field coils 22 and 32. One of the slip rings denotes a common terminal of the field coils 22 and 32 and acts as a ground terminal. The other two slip rings act as terminals through which electric currents are fed to the field coils 22 and 32. Electric currents fed to the field coils 22 and 32 induce magnetic fields in the rotor cores 21 and 31, and directions of magnetic fluxes $\Phi1$ and $\Phi2$ in the boss portions 211 and 311 of the rotor cores 21 and 31 are set to be the same as each other.

Each of the stator cores 23 and 33 is composed of a plurality of stator core members (not shown) serially disposed along the circumferential direction so as to surround the corresponding rotor core 21 or 31, and each of the stator coil 24 or 34 has a phase coil inserted into slots of the stator core members for each of three phases. Each of the stator coil 24 or 34 has a front coil end portion and a rear coil end portion, respectively, protruding from front and rear side surfaces of the stator coil in the axial direction.

The number of turns of the stator coil 24 wound on the stator core 23 is set to be larger than the number of turns of the stator coil 34 wound on the stator core 33, so that the stator core 23 is longer than the stator core 33 in the axial direction. In conformity with this difference in size between the stator cores 23 and 33, the rotor core 21 is longer than the rotor core 31 in the axial direction so as to cause the rotor core 21 to be heavier in weight than the rotor core 31, and the number of turns of the field coil 22 wound on the rotor core 21 is set to be larger than the number of turns of the field coil 32 wound on the rotor core 31. Therefore, a higher voltage VH is generated in the rotary section 2, and a lower voltage VL (VL<VH) is generated in the rotary section 3.

The circuit device 8 has a pair of three-phase full wave rectifiers (not shown) and a pair of regulators (not shown). Field currents to be fed to the field coils 22 and 32 are controlled in the regulators independently from each other to control currents and voltages outputted from the stator coils 24 and 34 independently from each other. An alternating current of the higher voltage is rectified in one rectifier, and a rectified current of the higher voltage is outputted to current consumers requiring the higher voltage. An alternating current of the lower voltage is rectified in the other rectifier, and a rectified current of the lower voltage is outputted to other current consumers requiring the lower voltage.

The cooling fan 9 is fixed to the pole portions 212 of the half cores placed on the front side of the rotor core 21, and the cooling fan 10 is fixed to the pole portions 312 of the half cores placed on the rear side of the rotor core 31. Each of the cooling fans 9 and 10 has centrifugal cooling vanes (not shown). When the cooling fans 9 and 10 are rotated with the rotor cores 21 and 31, the cooling fan 9 accelerates air received from inlet holes opened in a front end wall of the front housing 1a, and the cooling fan 10 accelerates air received from inlet holes opened in a rear end wall of the rear housing 1c. The air accelerated in the fan 9 passes through the rotor core 21 and the coil end portions of the stator coils 24 and is outputted outside the generator from outlet holes opened in side walls of the front and center housings 1a and 1b. The air accelerated in the fan 10 passes through the rotor core 31 and the coil end portions of the stator coils 34 and is outputted outside the generator from outlet holes opened in side walls of the center and rear housings 1b and 1c.

Next, a relationship between cooling performance and the arrangement of the rotary sections 2 and 3 is described.

A conventional tandem type rotary generator has the arrangement such that electro-magnetic characteristics are heightened without regard to length of the rotary generator in its axial direction. More specifically, a center position of a magnetic field induced in each rotor core is set to coincide with a center position of a corresponding stator core in the axial direction. Because a center position of the induced magnetic field coincides with a center position of a field coil in the axial direction, the center position of the field coil is set so as to coincide with the center position of the stator core in the axial direction. In this case, a distance between center positions of two field coils of two rotor cores disposed tandem becomes equal to a distance between center positions of two stator cores, so that a dead space is inevitably formed between the rotor cores so as to lengthen the rotary generator in the axial direction. A maximum length of the dead space in the axial direction is equal to a distance between the stator cores which is larger than a sum of a length of one end coil portion of one stator coil and a length of one end coil portion of the other stator coil. When the rotary generator has the arrangement such that it is difficult to install a cooling fan between the rotor cores, this dead space excessively lengthen the rotary generator in the axial direction.

In contrast, in this embodiment, the center C3 of the field coil 22 is offset or placed away from the center C1 of the stator core 23 in the axial direction so as to be shifted toward the rotor core 31, and the center C4 of the field coil 32 is offset or placed away from the center C2 of the stator core 33 in the axial direction so as to be shifted toward the rotor core 21. Therefore, a distance between the rotor cores 21 and 31 can be shortened, and a space between the rotor cores 21 and 31 can be reduced so as to be used only for the spacer 11.

For example, a position of a front end surface of the rotor core 21 substantially coincides with a position of a front end surface of the stator core 23 in the axial direction. A rear end surface of the rotor core 21 is placed so as to be protruded from a position of a rear end surface of the stator core 23 toward the rear side, and a position of the rear end surface of the rotor core 21 substantially coincides with a top position of the rear coil end portion of the stator coil 24 in the axial direction. In the same manner, a position of a rear end surface of the rotor core 31 substantially coincides with a position of a rear end surface of the stator core 33 in the axial direction. A front end surface of the rotor core 31 is placed so as to be protruded from a position of a front end surface of the stator core 33 toward the front side, and a position of the front end surface of the rotor core 31 substantially coincides with a top position of the front coil end portion of the stator coil 34 in the axial direction.

In this case, a distance between an inner wall of the front housing 1a and the front end surface of the rotor core 21 becomes larger than a length of the front end coil portion of the stator coil 24 in the axial direction. Therefore, the cooling fan 9 can be positioned to be aligned with the front end coil portion of the stator coil 24 in the radial direction, and the cooling fan 9 having a large size can be installed in a space between the front housing 1a and the rotor core 21. In the same manner, a distance between an inner wall of the rear housing 1c and the rear end surface of the rotor core 31 becomes larger than a length of the rear end coil portion of the stator coil 34 in the axial direction. Therefore, the cooling fan 10 can be positioned to be aligned with the rear end coil portion of the stator coil 34 in the radial direction, and the cooling fan 10 having a large size can be installed in a space between the rear housing 1c and the rotor core 31.

Accordingly, the fans 9 and 10 can effectively cool the rotor cores 21 and 31, the field coils 22 and 32 and the stator coils 24 and 34. That is, even though the rotor cores 21 and 31 are rotated at low speed, a large amount of air accelerated in the fans 9 and 10 can sufficiently cool the rotary sections 2 and 3. Therefore, deterioration of electric insulation performance of resin coated on the coils can be suppressed or prevented.

Next, heat dissipation using the spacer 11 is described in detail.

When a degree of heat generated in one of the rotary sections 2 and 3 (particularly, field coils 22 and 32) is higher than that generated in the other rotary section, the spacer 11 having a superior thermal conductivity dissipates the higher degree of generated heat to the other rotary section. Therefore, the spacer 11 can prevent the rotary sections 2 and 3 from being extremely heated. For example, the rotary section 2 does not always generate electric power but sometimes generates power of high-voltage to supply currents to current consumers requiring the high voltage. The rotary section 3 always generates a low voltage to supply currents to current consumers requiring the low voltage. When the rotary section 2 does not generate electric power, the spacer 11 having a superior thermal conductivity dissipates heat generated in the field coil 32 to the rotor core 21. Therefore, the spacer 11 can suppress increase in temperature of the field coil 32 so as to prevent increase in electric resistance of the field coil 32, so that the spacer 11 can suppress deterioration of insulation performance of resin coated on the field coil 32. When the rotary section 2 generates electric power, the rotary section 3 rarely generates electric power in full load operation. Therefore, the spacer 11 dissipates heat generated in the field coil 22 to the rotor core 31 so as to suppress increase in temperature of the field coil 22, so that the spacer 11 can suppress deterioration of insulation performance of resin coated on the field coil 22.

In this embodiment, the spacer 11 is made of non-magnetic material to independently control magnetic fields induced in the rotor cores 21 and 31. However, in another embodiment, the spacer 11 may be made of magnetic material such as soft iron to form a magnetic path common to the half cores placed on the rear side of the rotor core 21 and the half cores placed on the front side of the rotor core 31. In this case, as shown in FIG. 1, it is preferred that directions of magnetic fluxes $\Phi 1$ and $\Phi 2$ induced in the rotor cores 21 and 31 be set such that magnetic flux density is reduced in the half cores adjacent to each other through the spacer 11.

Next, a positional relationship between the rotor cores 21 and 31 with respect to the pulley 5 is described.

Because the rotor core 21 is heavier than the rotor core 31, a torque required in the rotor core 21 is larger than that required in the rotor core 31. The rotor core 21 is disposed on the front side on which the pulley 5 is connected with the shaft 4, and the rotor core 31 is disposed on the rear side. Therefore, a distance between the rotor core 21 and the pulley 5 in the axial direction is smaller than a distance between the rotor core 31 and the pulley 5 in the axial direction. In this case, when the shaft 4 receiving a torque from the pulley 5 is rotated, a degree of torsion acting on the shaft 4 can be reduced as compared with a case where a rotary generator has the rotor core 21 positioned on the rear side and the rotor core 31 positioned on the front side. Accordingly, a diameter of the shaft 4 can be reduced.

Next, the arrangement of the circuit device 8 in the generator is described.

Because the number of turns of each coil in the rotary section 2 is larger than that in the rotary section 3, a degree of heat generated in the rotary section 2 is larger than that in the rotary section 3. Therefore, temperature of the front housing 1a near to the rotary section 2 becomes higher than that of the rear housing 1c near to the rotary section 3. Assuming that the circuit device 8 (particularly, rectifiers) is heated over a maximum allowable temperature, the circuit device 8 cannot control currents and voltages outputted from the stator coils 24 and 34. To suppress increase in temperature of the circuit device 8, the circuit device 8 is positioned away from the rotary section 2 as far as possible. For example, the circuit device 8 is placed on an outside wall of the rear housing 1c.

Next, another arrangement of rotor core members is described.

In the generator shown in FIG. 1, each pair of rotor core members of the rotor cores 21 and 31 placed at the same position in the circumferential direction has two larger half cores placed on the same (front or rear) side of the rotor cores 21 and 31. However, as shown in FIG. 2, each pair of rotor core members of the rotor cores 21 and 31 placed at the same position in the circumferential direction may have two larger half cores placed on the different sides of the rotor cores 21 and 31. In this embodiment, because each nail portion 213 placed on the rear side of the rotor core 21 and the corresponding nail portion 313 placed on the front side of the rotor core 313 are adjacent to each other, leaking of magnetic fluxes in the rotor cores 21 and 31 can be effectively lowered.

Next, rectification in the circuit device 8 is described in detail.

Figure 3:
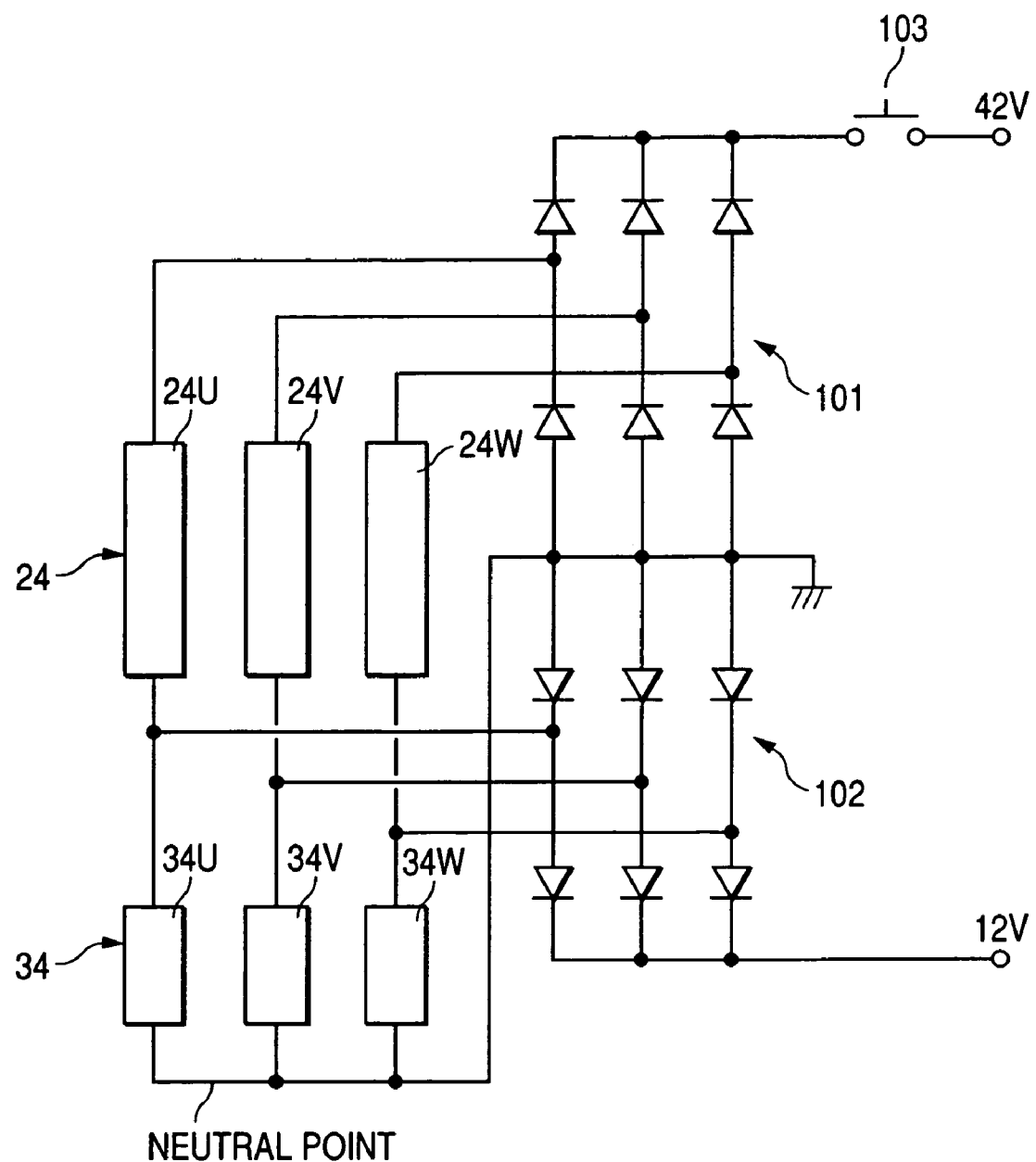
FIG. 3 is a circuit diagram of rectifiers of a circuit device shown in FIGS. 1 and 2 according to an embodiment of the present invention.

FIG. 3 is a circuit diagram of rectifiers of the circuit device 8 according to an embodiment. As shown in FIG. 3, the stator coil 24 is composed of a phase coil 24U for a U phase, a phase coil 24V for a V phase and a phase coil 24W for a W phase. The stator coil 34 is composed of a phase coil 34U for the U phase, a phase coil 34V for the V phase and a phase coil 34W for the W phase. The phase coils of the stator coils 24 and 34 are serially connected with each other for each phase. Input terminals of the coils 34U, 34V and 34W are connected with one another at a neutral point, and the neutral point is grounded. Output terminals of the coils 34U, 34V and 34W are connected with a common lower voltage terminal through a three-phase full wave rectifier 102. Output terminals of the coils 24U, 24V and 24W are connected with a common higher voltage terminal through a three-phase full wave rectifier 101 and a switch 103.

A three-phase alternating current is always generated in the stator coil 34 and is rectified in the rectifier 102 to obtain a rectified current of a lower voltage VL (VL=12V). Then, the rectified current is outputted to current consumers requiring the lower voltage VL. When other electric consumers require electric power of a higher voltage VH (VH=42V), the switch 103 is turned on, and a field current is supplied to the field coil 22. Therefore, a voltage of a portion of the alternating current generated in the stator coil 34 is increased in the stator coil 24 by a predetermined value V1, and an alternating current outputted from the stator coil 24 is rectified in the rectifier 101 to obtain a rectified current of the higher voltage VH (VH=V1+VL). Then, the rectified current is outputted to the current consumers.

Accordingly, as compared with a case where an alternating current of the higher voltage VH is generated in the stator coil 24 independently from the lower voltage VL generated in the stator core 34, because voltage increase in the stator coil 24 is low, the number of turns of each phase coil in the stator coil 24 can be reduced. Further, a sectional area of each phase coil in the stator coil 24 can be enlarged due to the reduction of the number of turns, so that heat generated in the phase coil can be reduced.

Figure 4:
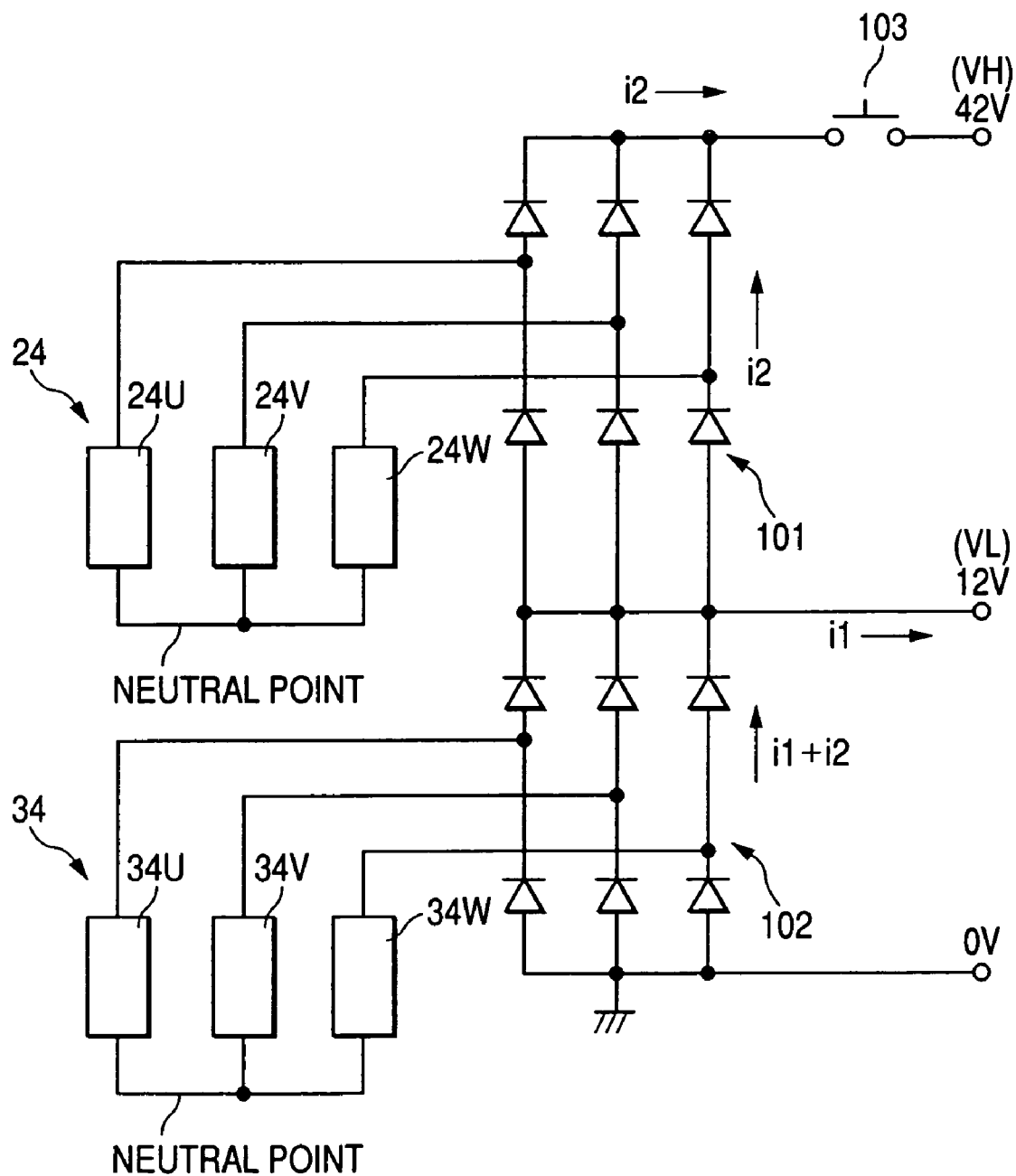
FIG. 4 is a circuit diagram of rectifiers of a circuit device shown in FIGS. 1 and 2 according to another embodiment of the present invention.

FIG. 4 is a circuit diagram of rectifiers of the circuit device 8 according to another embodiment.

As shown in FIG. 4, input terminals of the rectifier 101 are, respectively, connected with output terminals of the rectifier 102 and are connected with a common lower voltage terminal. Input terminals of the rectifier 102 are grounded, and output terminals of the rectifier 101 are connected with a common higher voltage terminal. Terminals of the stator coil 24 are connected with one another at a neutral point, and other terminals of the stator coil 24 are connected with the rectifier 101. Terminals of the stator coil 34 are connected with one another at a neutral point, and other terminals of the stator coil 34 are connected with the rectifier 102.

An alternating current of the lower voltage VL is always generated in the stator coil 34 while controlling a field current supplied to the field coil 32, and the current is rectified in the rectifier 102. Then, a rectified current of the lower voltage VL is outputted. When other electric consumers require electric power of the higher voltage VH, a voltage of a current i2 rectified in the rectifier 102 is increased in the stator core 24 by a predetermined value V1 while controlling a field current supplied to the field coil 22, and the current i2 is rectified in the rectifier 101 to obtain a rectified current i2 of the higher voltage VH (VH=V1+VL). Then, the rectified current i2 is outputted to the current consumers.

Therefore, in the same manner as in the circuit device 8 shown in FIG. 3, the number of turns of each phase coil in the stator coil 24 can be reduced, and a sectional area of each phase coil in the stator coil 24 can be enlarged. Accordingly, heat generated in the phase coil can be reduced.

Further, as compared with the circuit device 8 shown in FIG. 3, the field current supplied to the field coil 32 is adjusted based on an electric potential difference (or lower voltage VL) between an inlet and an outlet of the rectifier 102 to control the lower voltage VL, and the field current supplied to the field coil 22 is adjusted based on an electric potential difference between an inlet and an outlet of the rectifier 101 to control the higher voltage VH. Accordingly, the control of the higher voltage VH and the control of the lower voltage VL can be performed independently from each other, in the same manner as a case where the rectifiers 101 and 102 are operated independently from each other.

What is claimed is:

1. A tandem type rotary generator comprising:
   a rotary shaft that is rotated on an axis thereof;
   two power generating sections disposed adjacent to each other along an axial direction of the rotary shaft, each of the power generating sections having a Lundell type rotor core fixed to the rotary shaft, a field coil wound on the Lundell type rotor core so as to generate a magnetic field in the Lundell type rotor core, a stator core disposed on an outside of the Lundell type rotor core opposite to the rotary shaft in a radial direction of the rotary shaft, and a stator coil wound on the stator core so as to generate electric power based on the magnetic field; and
   a cooling section which cools the power generating sections, wherein the rotor cores are disposed to face each other such that a center of the field coil of each power generating section in the axial direction is positioned away from a center of the stator core of the power generating section in the axial direction toward the other power generating section, and the cooling section has two cooling fans disposed, respectively, on both sides of the pair of rotor cores in the axial direction.

2. The rotary generator according to claim 1, further comprising:
   a spacer disposed between the power generating sections and attached to the power generating sections such that heat generated in one of the power generating sections is transmitted to the other power generating section through the spacer.

3. The rotary generator according to claim 1, further comprising:
a torque transmitter which is adapted to transmit torques required in the power generating sections to the rotary shaft,
wherein the torques required in the power generating sections differ from each other, and the torque transmitter is disposed on an outside of the power generating section requiring a larger torque opposite to the other power generating section requiring a smaller torque in the axial direction.

4. The rotary generator according to claim 1, further comprising:
a current controller which is adapted to control currents outputted from the stator coils,
wherein degrees of electric power generated in the power generating sections differ from each other, the current controller is disposed on a side of the power generating section generating a lower degree of electric power opposite to the other power generating section generating a higher degree of electric power in the axial direction.

5. The rotary generator according to claim 1, further comprising:
a rectifier which is adapted to rectify alternating currents of the electric power generated in the stator coils and to output a first voltage and a second voltage based on the rectified currents,
wherein the rectifier generates the first voltage from voltages of the rectified currents such that the first voltage is higher than the voltages of the rectified currents and the second voltage.

6. The rotary generator according to claim 1, wherein a center of the rotor core of each power generating section in the axial direction is substantially the same as the center of the field coil of the power generating section.

7. The rotary generator according to claim 1, wherein the rotor core of each power generating section has a side surface on a side opposite to a side of the other power generating section, the stator core of each power generating section has a side surface on a side opposite to a side of the other power generating section, a position of the side surface of the rotor core of each power generating section is substantially the same as a position of the side surface of the stator core of the power generating section in the axial direction, a coil end portion of the stator coil is protruded from the side surface of the stator core in the axial direction in each power generating section, and the cooling fans are disposed on the respective side surfaces of the rotor cores.

8. The rotary generator according to claim 1, further comprising:
a current controller which is adapted to control currents outputted from the stator coils independently from each other.

9. The rotary generator according to claim 1, wherein each of the cooling fans has centrifugal cooling vanes fixed to the corresponding rotor core so as to be rotated around the rotary shaft, and a cooling air is accelerated by the centrifugal cooling vanes so as to cool the corresponding power generating section.

10. The rotary generator according to claim 1, wherein no cooling section is disposed between the power generating sections.

11. The rotary generator according to claim 1, further comprising a slip ring disposed on the rotary shaft to feed electric current to the field coils of the two power generating sections.

* * * * *